Sept. 14, 1965  C. S. COCKERELL  3,205,959
VEHICLES FOR TRAVELLING OVER LAND AND/OR WATER WITH
MEANS TO RECOVER AIR FROM THE FLUID CURTAIN
Filed May 22, 1962  3 Sheets-Sheet 1
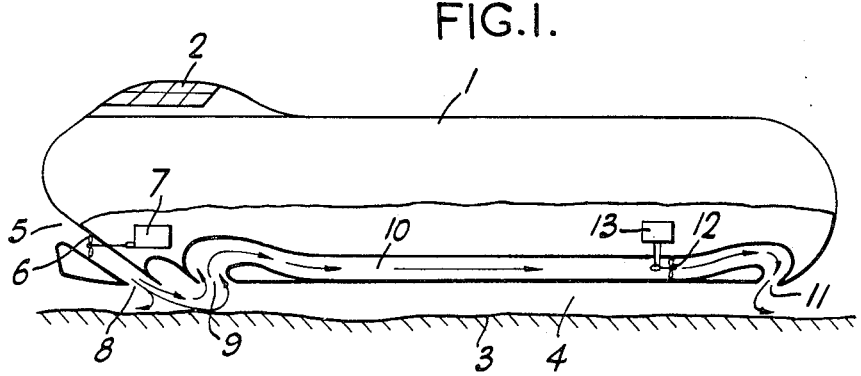
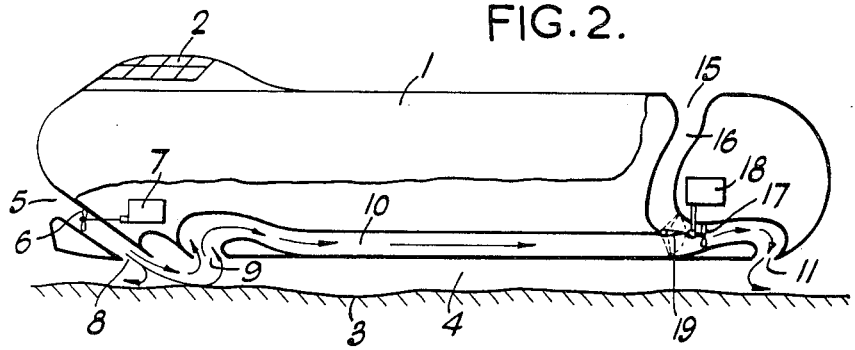
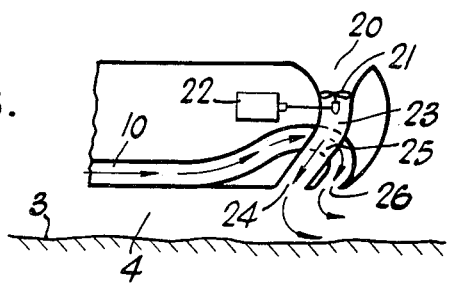
INVENTOR
C. S. COCKERELL
BY
Cameron, Kerkam & Sutton
ATTORNEYS

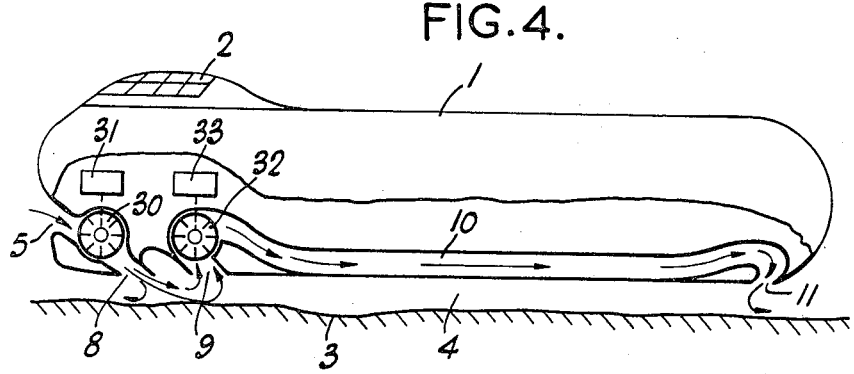
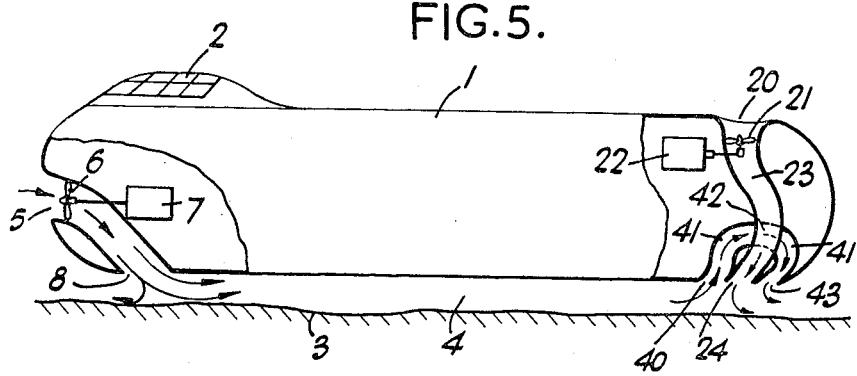
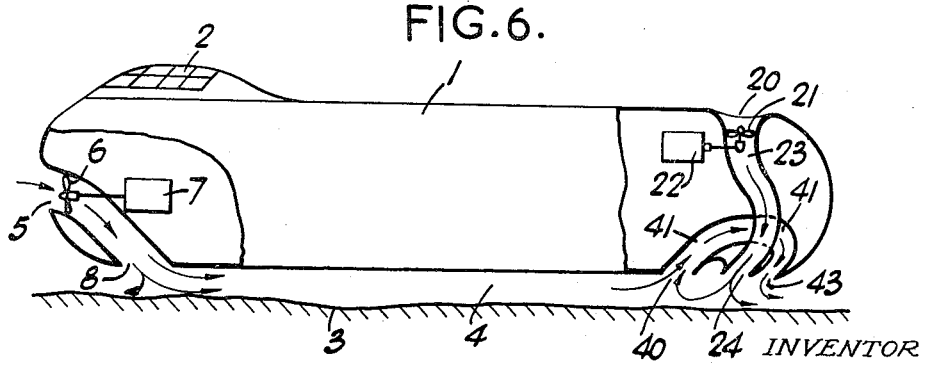

INVENTOR
C. S. COCKERELL
BY
Cameron, Kerkam & Sutton
ATTORNEYS

United States Patent Office 3,205,959
Patented Sept. 14, 1965

3,205,959
VEHICLES FOR TRAVELLING OVER LAND AND/OR WATER WITH MEANS TO RECOVER AIR FROM THE FLUID CURTAIN
Christopher Sydney Cockerell, Bassett, Southampton, England, assignor to Hovercraft Development Limited, London, England, a British company
Filed May 22, 1962, Ser. No. 196,812
Claims priority, application Great Britain, May 24, 1961, 18,709/61
5 Claims. (Cl. 180—7)

This invention relates to vehicles for operating over land and/or water, and which are supported clear of the surface over which they are operating by a cushion, or cushions, of pressurised fluid, the cushion or cushions being partly or wholly formed and contained by one or more curtanns of fluid issuing from the bottom of the vehicle.

According to the present invention there is provided a vehicle for operating over land and/or water, which is supported above the surface over which it is operating by at least one cushion of pressurised gas formed and contained at least in part by a curtain of fluid issuing from the bottom of the vehicle in which means are provided for causing at least part of the fluid forming a fluid curtain at the front of the vehicle to be recovered into the vehicle and used to form or assist in forming at least one fluid curtain at the rear of the vehicle. In one particular form of vehicle at least part of the fluid forming the front curtain or curtains is recovered through one or more recovery ports formed in the bottom of the vehicle adjacent to the supply port or ports from which flows the fluid forming the front curtain or curtains, and is fed through a duct or ducts formed inside the vehicle to one or more supply ports formed in the bottom of the vehicle at the rear thereof to form one or more curtains of fluid across the rear of the vehicle.

Where a duct or ducts is or are formed inside the vehicle to convey the fluid from the front of the vehicle to the rear, there is incurred a loss in volume available for carriage of goods and/or passengers, and also a weight penalty. In an alternative form of vehicle, at least part of the fluid forming the front curtain or curtains flows into the cushion space and is recovered through recovery ports formed in the bottom of the vehicle inboard of, but adjacent to, a supply port, or series of supply ports, formed in the bottom of the vehicle parallel to and adjacent to the periphery of the rear of the vehicle, the fluid recovered through the recovery port or ports flowing through a duct or ducts to the supply port or ports to form one or more curtains of fluid across the rear of the vehicle. By such a construction the length of ducting required between the recovery port or ports and the supply port or ports, through which issues the fluid forming the curtain or curtains across the rear of the vehicle, is reduced to a minimum.

The invention will be understood by the following description of certain embodiments of the invention in conjunction with the accompanying drawings, in which:

FIGURE 1 is a side view, partly in section, of a vehicle embodying the invention.

FIGURE 2 is a siimlar view to that of FIGURE 1 illustrating a modification thereof.

FIGURE 3 is a further view similar to that of FIGURE 1 illustrating yet another modification.

FIGURE 4 is another side view of a vehicle, partly in section, illustrating another embodiment.

FIGURE 5 is a further side view of a vehicle, partly in section, illustrating a further embodiment.

FIGURE 6 is a similar view to that of FIGURE 5 illustrating a modification thereof.

Figure 7:
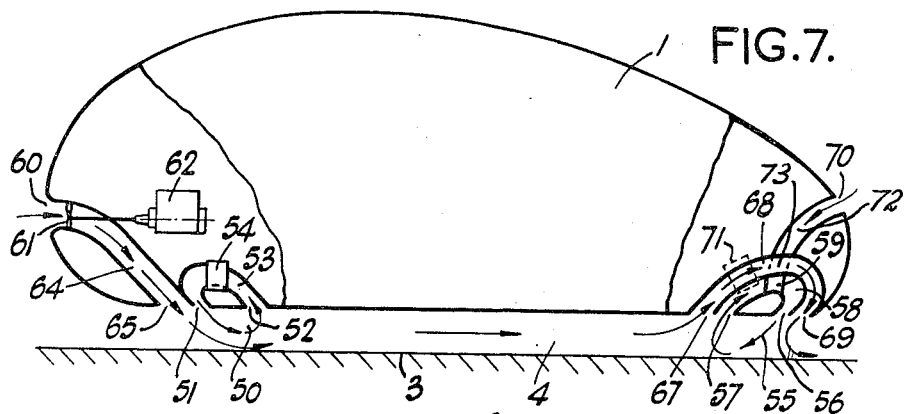
FIGURE 7 is a side view of a vehicle, partly in section, illustrating yet a further embodiment.

The vehicle illustrated in FIGURE 1 has a main body 1 with a control room 2 at its forward end. The vehicle is supported above the surface 3, which may be land, water, snow, mud, sand and the like by a cushion of gas formed in the space 4. The cushion is formed and contained by curtains of fluid in the present example. The curtain at the front of the vehicle is formed by air which enters a forward facing intake 5 positioned at the front of the vehicle and extending across the vehicle, the air being energised by a series of propellers 6 driven by engines 7. The air issues from a supply port 8 extending across the front of the vehicle which is inclined so as to eject the air in a downward and rearward direction to form the curtain.

Situated slightly aft of the supply port 8 is a recovery port 9, also extending across the vehicle, and the air forming the curtain is deflected round and upwards by the pressure of the cushion in the space 4, flowing into the recovery port 9. From the recovery port 9 the air flows through a duct 10 to a supply port 11 formed across the rear of the vehicle. The air is re-energised whilst flowing through the duct by propellers 12 driven by engines 13. The supply port 11 at the rear of the vehicle is inclined so as to eject the air in downward and forward direction, the air then being deflected round and outwards by the pressure of the cushion.

The cushion is contained along the sides of the vehicle by further curtains of air issuing from the bottom of the vehicle.

It will be appreciated that on first starting up the vehicle, no cushion is in being in the space 4. Air flows into this space from the supply port 8 at the front of the vehicle and also air flows in from the curtains along the sides of the vehicle. No curtain will initially be formed at the rear of the vehicle until a cushion of air has been formed in the space 4, the pressure of which is sufficient to deflect the air forming the front curtain into the recovery port 9. Thus the formation of the cushion is likely to be slow due to the escape of air from the rear of the vehicle.

FIGURE 2 illustrates a vehicle in which separate means are provided for initially forming the rear curtain. Air is drawn in through an intake 15 flows through a duct 16 and energised by a series of propellers 17 driven by engines 18. The duct 16 and the duct 10 through which flows the air from the recovery port 9 combine into a single duct before reaching the propellers 17 and a flap valve 19 is positioned so as to be able to shut off either the duct 16 or the duct 10. At starting, the duct 10 is shut off from the propellers 17 and air is drawn in through the intake 15, finally issuing from the supply port 11. Once the cushion has been formed in the space 4, the valve 19 is operated to open duct 10 and shut off the duct 16. If desired, the valve may also be positioned at a mid position so as to open both ducts 10 and 16, to the propellers.

FIGURE 3 illustrates a modification of the arrangement illustrated in FIGURE 2 in which a primary air curtain is formed at the rear of the vehicle by air drawn in through an intake 20 and energized by propellers 21 driven by engines 22. The air flows through a duct 23 and issues from a supply port 24 in a downward and inward or forward direction, being deflected round and outward by the cushion pressure. The air which flows through the duct 10 flows through pipes 25 which pass transversely through, but do not open into, the duct 23 and issues from a further supply port 26 positioned to the rear of and immediately adjacent to the supply port 24. The air issues from the supply port 26 initially in a downward and inward direction to form a secondary curtain which strengthens the primary curtain.

FIGURE 4 illustrates a vehicle in which pumps of the so-called "cross-flow" type are used to energise the air. The air enters the intake 5 and is energised by a pump 30 driven by an engine 31. The pump extends substantially across the width of the vehicle. The air issues from the supply port 8 and is deflected by the cushion in space 4 into the recovery port 9 as in FIGURES 1, 2 and 3. In the present example the air is then re-energised by a further pump 32 of the cross-flow type driven by an engine 33. After being re-energised, the air flows into the duct 10 to the supply port 11 at the rear of the vehicle. The re-energising pump 32 can be positioned at any convenient position along the duct 10.

With vehicles having the above described arrangements the direction of the air flow in contact with the surface is in the same direction as the movement of the surface relative to the vehicle. A reduction in spray generation over water, and dust and the like clouds over other surfaces is one of the advantages obtained. There is a penalty in weight and volume due to the duct which transfers the air from the front to the rear of the vehicle.

FIGURE 5 illustrates a vehicle in which the advantage described above is retained without the penalty of a duct. Air enters at the front of the vehicle by means of the intake 5 and is energised by propellers 6 driven by engines 7, as in FIGURE 1. The air issues from the supply port 8 but instead of being deflected upwards into a recovery port the air flows into the space 4 occupied by the cushion of air. At the rear of the vehicle a primary curtain of air is formed by air drawn in through intake 20 by propellers 21 driven by engines 22, as in FIGURE 3. The air flows through the duct 23 and issues from the supply port 24. Formed immediately inside and adjacent to the supply port 24 is a recovery port 40. A flow of air corresponding to that flowing into the space 4 from the front air curtain flows into the recovery port 40, through the duct 41, which crosses the duct 23 by pipes 42, and finally issues from a further supply port 43 formed outside and immediately adjacent to the supply port 24, to form a secondary air curtain.

FIGURE 6 illustrates a modification of FIGURE 5 in which the recovery port 40 is spaced inwards from the supply port 24 by a short distance. In such an arrangement part of the air issuing from the supply port 24 flows inwards and is deflected upwards into the recovery port 40. The remainder of the air issuing from the supply port 24 is deflected round and outwards as before.

FIGURE 7 illustrates a further vehicle which is a modification of the vehicle illustrated in FIGURES 5 and 6. Formed beneath the front of the vehicle, and extending across the width thereof, is a closed re-circulation curtain 50. Air issues from an inner supply port 51 to form an inner curtain, the air after deflection by the cushion being recovered through a recovery port 52. From the recovery port the air flows via a duct 53 back to the inner supply port 51, being re-energised by one or more compressors or the like 54.

A similar closed recirculation curtain 55 is formed beneath the rear of the vehicle, extending across the width thereof. Air issues from an inner supply port 56 to form a curtain and after deflection by the cushion is recovered through a recovery port 57. From the recovery port the air flows back to the inner supply port 56 via a duct 58, being re-energised by one or more compressors or the like 59.

An additional curtain is formed immediately outside the front inner curtain, by air drawn in through an intake 60 by propellers 61 driven by motors 62. This air flows via a duct 64 to an outer supply port 65 formed in the bottom of the vehicle across the width thereof, immediately outboard and parallel to the inner supply port 51. The air from the outer supply port forms an outer curtain, flowing downwards and inwards, parallel to the inner curtain formed by the air issuing from the inner supply port. Depending upon the relative strengths of the front and rear curtains and on the forward speed of the vehicle, at least some of the air of the outer curtain eventually flows under the inner curtain in contact with the surface over which the vehicle is operating, into the cushion space 4.

Formed in the bottom of the vehicle adjacent and parallel to and on the inside of the recovery port 57 at the rear of the vehicle, is a further recovery port 67. A flow of air, corresponding to the flow of air into the cushion space from the additional curtain at the front of the vehicle, flows from the cushion space into the further recovery port 67, and flows via a duct 68, formed round the outside of the duct 58, to an outer supply port 69. The outer supply port 69 is formed in the bottom of the vehicle immediately outboard of and parallel to the inner supply port 56, and extends the width of the vehicle. The air from the outer supply port 69 flows in the form of a curtain downwards and inwards parallel to the inner curtain at the rear of the vehicle, then deflecting round and outwards as shown. Although the direction of the air forming the rear inner curtain 55 in contact with the surface is opposite in direction to the movement of the surface relative to the vehicle, the direction of movement of the air of the additional rear curtain when in contact with the surface, is in the same direction as the relative movement of the surface. This tends to restrict the formation of spray when over water, or dust clouds or the like when over land or other similar surfaces.

For starting operation of the vehicle shown in FIGURE 7, the outer curtain at the front may be used to contain the cushion at the front, while air from an auxiliary inlet 70 may be fed to the compressor 59, through a duct 72 which crosses the duct 68 by pipes 73, to form the rear inner curtain. The vehicle will lift from the surface, allowing air to flow to the recovery ports 52 and 57. Eventually the front and rear inner curtains will be formed, the vehicle lifting further and air flowing from the front of the vehicle to the rear recovery port 67, resulting in the formation of the outer rear curtain. Alternatively, air may be fed to the compressor 54 directly from the intake 60 or from some other suitable source. It may also be necessary to supply air from the auxiliary intake 70 direct to the compressor 59 during operation of the vehicle if for any reason the recovery of air through the recovery ports becomes restricted. The flow of air through the duct 68 may be re-energised by further compressors 71.

Figure 8:
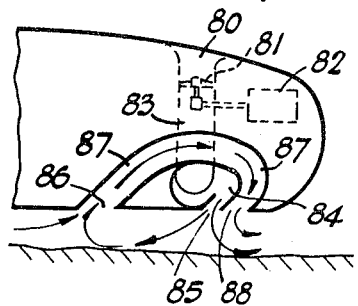
FIGURE 8 is a vertical cross section of the rear part of a vehicle somewhat as illustrated in FIGURES 5 and 6, illustrating a modification thereof.
Figure 9:
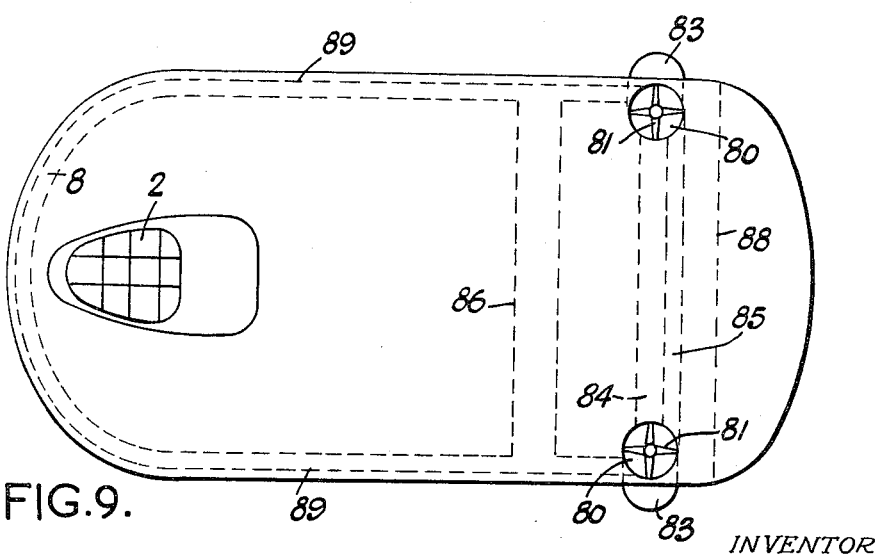
FIGURE 9 is a plan view of a vehicle as illustrated in FIGURE 6 with the modification illustrated in FIGURE 8.

In the arrangements illustrated in FIGURES 3, 5 and 6, the crossing over of the ducts at the rear of the vehicle results in an inefficient air flow. This can be obviated if the flow of air to the supply port from which is formed the primary air curtain is by means of a duct which is fed at its ends. FIGURES 8 and 9 illustrate one such arrangement.

The air for the primary curtain is drawn in through intakes 80, situated on each side of the vehicle, by propellers 81 driven by engines 82. The air flows down ducts 83 formed outside the vehicle and then into a duct 84 positioned across the bottom of the vehicle. The duct 84 connects the lower ends of the ducts 83. Formed in the bottom of the duct 84 is a supply port 85 which extends the length of the duct. Formed in the bottom of the vehicle and spaced inwards of the supply port 85 is a recovery port 86. The air entering the intake 80 flows through the ducts 83 and 84, issuing from the supply port 85 in an inward and downward direction. Part of the air flows inwards and is deflected round and upwards into the recovery port 86 together with the flow of air corresponding to that which flows into the space 4 from the front air curtain or curtains.

The air which enters the recovery port 86 flows through a duct 87 which passes over the duct 84. The duct 87 connects with a further supply port 88 formed adjacent to and outside of the supply port 85.

As illustrated in FIGURE 9, the cushion is contained in the space 4 along the sides of the vehicle by curtains of air formed from supply ports 89 formed in the bottom of the vehicle along the sides thereof.

The cushion of air can be contained along the sides alternatively by side-walls depending from bottom of the vehicle, or by a combination of side-walls and air curtains. The cushions may also be sub-divided by further downwardly depending members and/or air curtains extending in a direction parallel to the fore and aft axis of the vehicle.

The fluid curtains can be formed of water when the vehicle is operating over water, in which case means are provided for supplying air or other gas to the cushion space.

I claim:

1. A vehicle for operating over land and/or water and which is supported above the surface over which it is operating by at least one cushion of pressurised gas formed and contained beneath the vehicle at least in part by curtains of fluid issuing from the bottom of the vehicle comprising means including a first supply port formed in the bottom of the vehicle at the front thereof for forming a single fluid curtain at the front of the vehicle, means including a second supply port formed in the bottom of the vehicle at the rear thereof for forming a fluid curtain at the rear of the vehicle, said front and rear curtains forming the front and rear boundaries of said cushion of pressurised gas, and means for recovering into the vehicle at a point rearwardly of said first supply port at least part of the fluid issuing from said first supply port and for supplying the recovered fluid to said second supply port so as to at least assist in forming the curtain at the rear of the vehicle, said last named means including a recovery port formed in the bottom of the vehicle inboard of and spaced slightly from said first supply port, through which flows that part of the fluid issuing from said first supply port which is recovered, and a duct connecting said recovery port with said second supply port into the recovery port.

2. A vehicle as claimed in claim 1 including means for re-energizing the recovered fluid.

3. A vehicle for operating over land and/or water and which is supported above the surface over which it is operating by at least one cushion of pressurised gas formed and contained beneath the vehicle at least in part by curtains of fluid issuing from the bottom of the vehicle comprising means including a first supply port for forming at least one fluid curtain at the front of the vehicle, means including a second supply port for forming at least one fluid curtain at the rear of the vehicle, means for recovering into the vehicle at a point rearwardly of said first supply port at least part of the fluid forming the curtain at the front of the vehicle and for supplying the recovered fluid to said second supply port so as to at least assist in forming the rear curtain including at least one recovery port formed in the bottom of the vehicle inboard of and spaced slightly from said first supply port and a duct connecting said recovery port with said second supply port, and means for supplying fluid to said second supply port independently of that supplied through said duct.

4. A vehicle as claimed in claim 3 wherein said last named means includes an air intake at the rear of the vehicle and a duct connecting said intake to said second supply port, said first named duct and said second named duct combining to form a single duct leading directly to said second supply port.

5. A vehicle as claimed in claim 4 including means for controlling the flow of fluid to said second supply port from said first named and second named ducts, and means positioned in said single duct for energising the fluid flowing therethrough to said second supply port.

References Cited by the Examiner

UNITED STATES PATENTS 3,027,860  4/62  Priest _____ 180—7 X

FOREIGN PATENTS 935,823  9/63  Great Britain
935,824  9/63  Great Britain.
935,826  9/63  Great Britain.
1,240,721  8/60  France.
1,263,704  5/61  France.

A. HARRY LEVY, *Primary Examiner.*

UNITED STATES PATENT OFFICE
CERTIFICATE OF CORRECTION

Patent No. 3,205,959　　　　　　　　　　　　September 14, 1965

Christopher Sydney Cockerell

It is hereby certified that error appears in the above numbered patent requiring correction and that the said Letters Patent should read as corrected below.

Column 1, line 17, for "curtanns" read -- curtains --; column 5, lines 46 and 47, for "port into the recovery port" read -- port. --.

Signed and sealed this 19th day of April 1966.

SEAL)

ttest:

RNEST W. SWIDER　　　　　　　　　　　　　　　EDWARD J. BRENNER
ttesting Officer　　　　　　　　　　　　　　　Commissioner of Patents